United States Patent
Reese

(10) Patent No.: US 6,722,463 B1
(45) Date of Patent: Apr. 20, 2004

(54) MOTOR MOUNTING SYSTEM AND METHOD

(75) Inventor: Terry L. Reese, Hephzibah, GA (US)

(73) Assignee: Textron Inc., Providence, RI (US)

( * ) Notice: Subject to any disclaimer, the term of this patent is extended or adjusted under 35 U.S.C. 154(b) by 0 days.

(21) Appl. No.: 09/590,100

(22) Filed: Jun. 8, 2000

(51) Int. Cl.$^7$ ................................................ B60K 5/12
(52) U.S. Cl. ................................ 180/292; 248/573
(58) Field of Search ..................... 180/291, 292, 180/295, 299, 908; 267/201, 279, 292, 294, 140.12, 141.2, 141.4, 281, 284, 141.1; 280/788; 248/634, 638, 573, 581

(56) References Cited

U.S. PATENT DOCUMENTS

| | | | |
|---|---|---|---|
| 1,445,604 A | | 2/1923 | Schroeder |
| 1,720,454 A | * | 7/1929 | Dickey .................... 267/141.1 |
| 1,919,484 A | * | 7/1933 | Saurer ........................ 267/294 |
| 1,930,067 A | * | 10/1933 | Tibbetts ...................... 267/294 |
| 2,001,029 A | | 5/1935 | Kulick et al. .................. 180/64 |
| 2,239,319 A | * | 4/1941 | Halford et al. ............. 267/294 |
| 2,322,477 A | | 6/1943 | Sjoberg ........................ 180/54 |
| 2,415,983 A | * | 2/1947 | Yerzley .................... 267/141.1 |
| 2,756,834 A | | 7/1956 | Daube ........................... 180/54 |
| 2,831,673 A | * | 4/1958 | Paulsen ...................... 267/292 |
| 2,836,254 A | | 5/1958 | Boehner ....................... 180/64 |
| 2,880,947 A | * | 4/1959 | Peirce ......................... 267/141 |
| 2,966,951 A | | 1/1961 | Lang ............................. 180/25 |
| 3,370,841 A | * | 2/1968 | Werner et al. .............. 267/292 |
| 4,151,822 A | * | 5/1979 | Miura et al. ............ 123/195 A |
| 4,406,344 A | * | 9/1983 | Fukushima .................. 267/292 |
| 4,425,956 A | | 1/1984 | Terlecke ................. 160/168 R |
| 4,425,976 A | | 1/1984 | Kimura ........................ 180/56 |
| 4,727,957 A | * | 3/1988 | Fujita .......................... 267/292 |
| 4,821,827 A | | 4/1989 | Reese .......................... 180/61 |
| 5,044,598 A | * | 9/1991 | Mann et al. ................. 248/638 |
| 5,215,382 A | * | 6/1993 | Kemeny ...................... 248/634 |
| 5,271,595 A | * | 12/1993 | Simon et al. ............... 180/291 |
| 5,291,966 A | * | 3/1994 | Kato ........................... 180/292 |
| 5,398,907 A | * | 3/1995 | Kelchner .................... 267/292 |
| 5,597,181 A | | 1/1997 | Lyles et al. ................. 280/846 |

FOREIGN PATENT DOCUMENTS

| | | | | |
|---|---|---|---|---|
| CH | 319112 | * | 3/1957 | ................. 180/295 |
| DE | 4029228 | * | 4/1991 | ................. 180/299 |
| FR | 2363033 | * | 3/1978 | ............. F16F/1/52 |
| JP | 5-65029 | * | 3/1993 | ................. 180/299 |

* cited by examiner

Primary Examiner—Frank Vanaman
(74) Attorney, Agent, or Firm—Harness, Dickey & Pierce, P.L.C.

(57) ABSTRACT

A motor mounting system for a vehicle is provided comprising a motor carrier frame and a resilient flexible member connecting the motor carrier frame to a chassis of the vehicle. The motor carrier frame comprises an overtravel cage with a portion of the chassis projecting into the cage and being movable in the cage.

8 Claims, 5 Drawing Sheets

MOTOR MOUNTING SYSTEM AND METHOD

BACKGROUND OF THE INVENTION

1. Field of the Invention

The present invention relates to motorized vehicles and, more particularly, to a system for mounting a motor to a chassis.

2. Prior Art

U.S. Pat. No. 4,821,827 discloses an engine mount for a golf cart having flanges on a chassis and a grommet located between the flanges and attached to a front flange on an engine mounting frame. A need exists for a motor mounting system which is relatively easy to assemble, provides a flexible connection, but limits over-travel, and which can accommodate a relatively small engine receiving area in a chassis.

SUMMARY OF THE INVENTION

In accordance with one embodiment of the present invention, a motor mounting system for a vehicle is provided comprising a motor carrier frame and a resilient flexible member connecting the motor carrier frame to a chassis of the vehicle. The motor carrier frame comprises an over-travel cage with a portion of the chassis projecting into the cage and being movable in the cage.

In accordance with another embodiment of the present invention, a motor mounting system for a motorized vehicle is provided comprising a motor carrier frame and a resilient flexible member connecting the motor carrier frame to a chassis of the vehicle. The resilient flexible member comprises a one-piece member with a first receiving aperture and a second receiving aperture. A portion of a first connection section on the chassis projects into the first receiving aperture and a portion of a second connection section on the motor carrier frame projects into the second receiving aperture.

In accordance with another embodiment of the present invention, a motor mounting system for a motorized vehicle is provided comprising a first connection section, a second connection section and a resilient flexible connection. The first connection section is stationarily connected to a chassis of the motorized vehicle. The first connection section comprises a first cantilevered projection. The second connection section is stationarily connected to a motor carrier frame. The second connection section comprises a second cantilevered projection. The resilient flexible connection connects the first and second cantilevered projections to each other. The first and second cantilevered projections project, at least partially, in a same direction from the chassis and the motor carrier frame, respectively.

In accordance with one method of the present invention, a method of connecting a motor carrier frame to a chassis of a vehicle is provided comprising steps of providing first and second cantilevered projections extending, at least partially, in a same direction from the chassis and the motor carrier frame, respectively; positioning the first cantilevered projection into a first aperture of a one-piece resilient flexible member; and positioning the second cantilevered projection into a second aperture of the one-piece resilient flexible member.

BRIEF DESCRIPTION OF THE DRAWINGS

The foregoing aspects and other features of the present invention are explained in the following description, taken in connection with the accompanying drawings, wherein.

DETAILED DESCRIPTION OF THE PREFERRED EMBODIMENT

Figure 1:
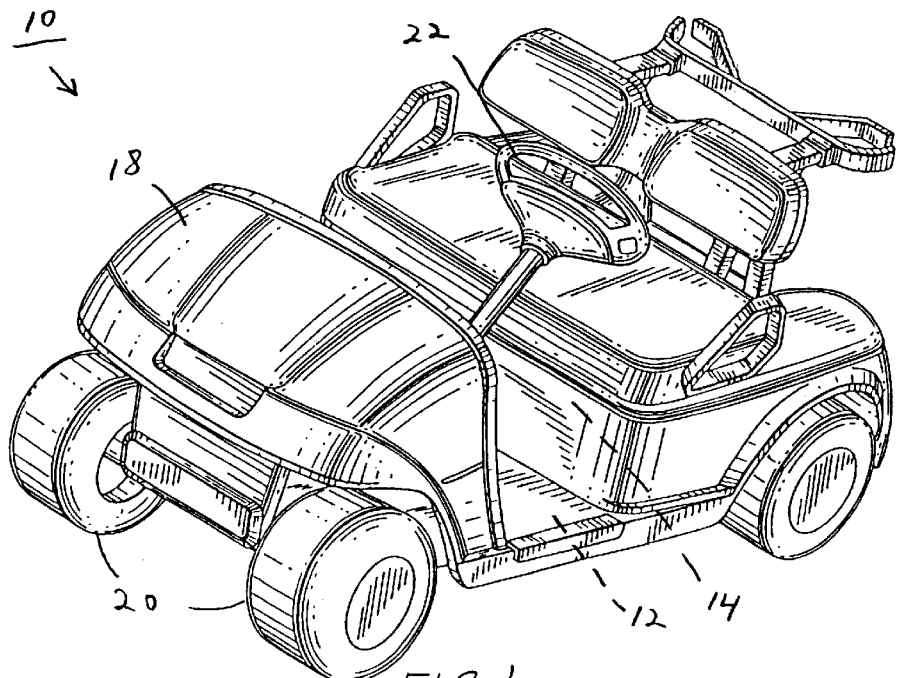
FIG. 1 is a perspective view of a golf car incorporating features of the present invention.

Referring to FIG. 1, there is shown a perspective view of a golf car 10 incorporating features of the present invention. Although the present invention will be described with reference to the embodiments shown in the drawings, it should be understood that the present invention can be embodied in many alternate forms of embodiments. In addition, any suitable size, shape or type of elements or materials could be used.

Figure 2:
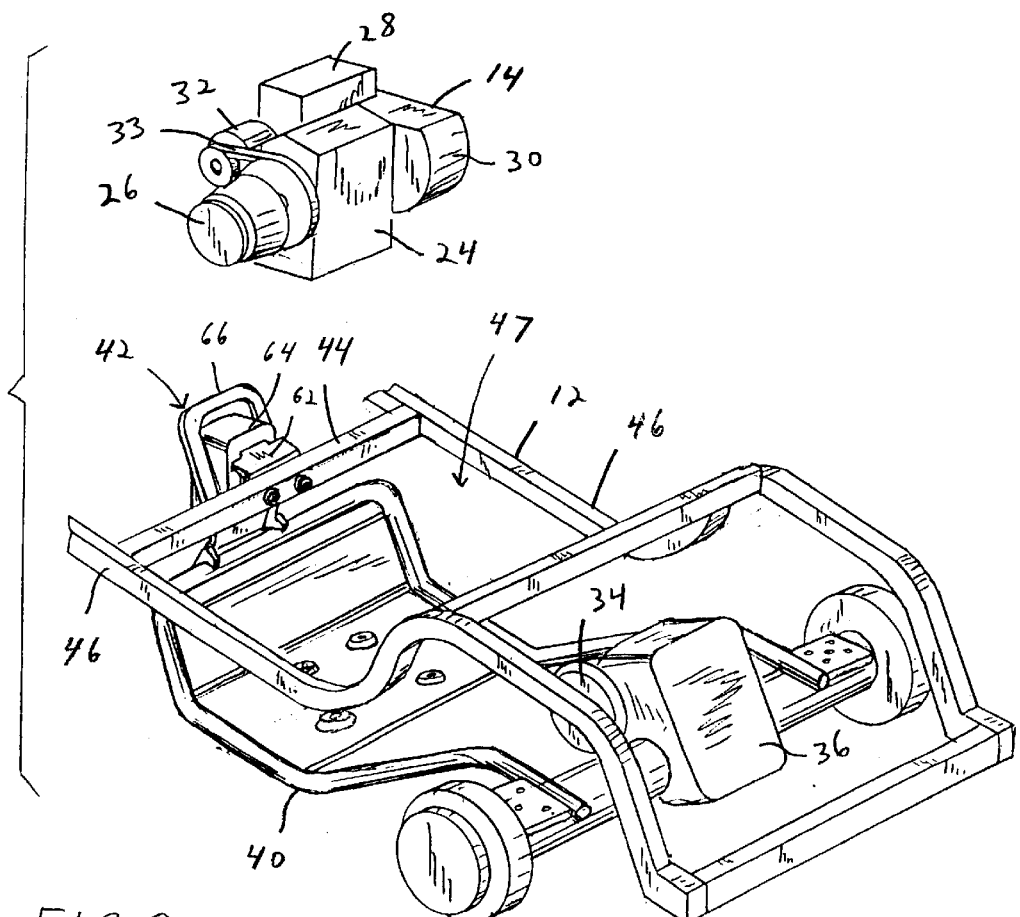
FIG. 2 is a partial exploded perspective view of some of the components used in the golf car shown in FIG. 1.

Although the present invention will be described with reference to a golf car, it should be understood that features of the present invention can be embodied in other types of cars and automobiles including other types of turf vehicles. Referring also to FIG. 2, the car 10 generally comprises (among other things) a chassis 12, a drive system, body parts 18, tires 20, brakes (not shown), and a steering system 22. The car 10 can have either an internal combustion engine drive system or an electric powered drive system. FIG. 2 shows the chassis 12 and the internal combustion engine 14 for the internal combustion engine powered car. As used herein, the term "internal combustion engine" is intended to include any suitable type of internal combustion engine powered by any suitable type of fuel, such as gasoline, natural gas, hydrogen, etc.

The engine 14, in the embodiment shown, is a four cycle engine with an engine block 24. However, any suitable type of engine could be used. The engine 14 has a drive clutch assembly 26 connected to an output shaft of the engine 14, an air filter assembly 28, a muffler 30, and an electric starter/generator 32. A belt 33 connects the starter/generator 32 to the drive clutch assembly 26. Another belt (not shown) connects the drive clutch assembly 26 to a driven assembly 34 on the rear axle assembly 36. This type of belt transmission is well known, as shown by U.S. Pat. No. 3,727,478, and has been used in golf cars for many years.

Figure 3:
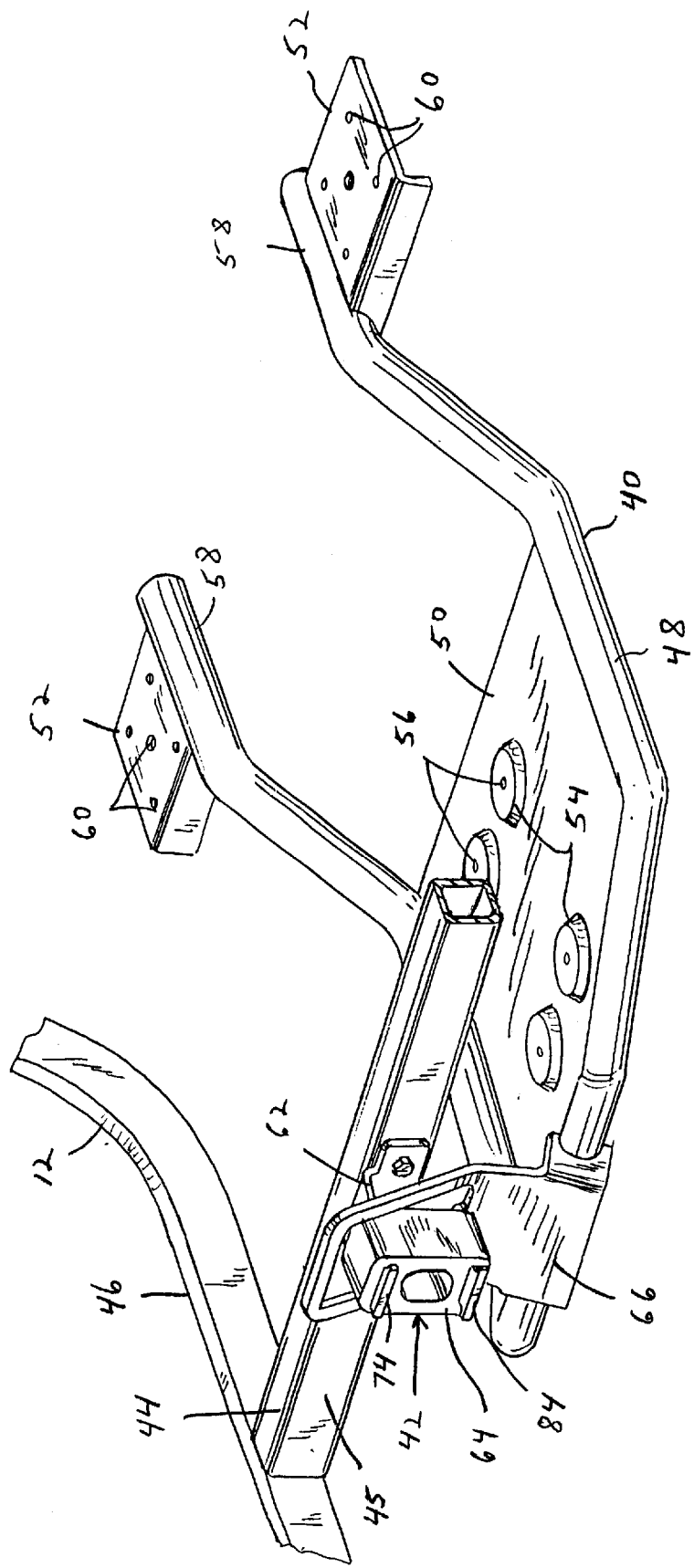
FIG. 3 is a partial perspective view of a portion of the chassis and the motor carrier frame shown in FIG. 2.
Figure 4:
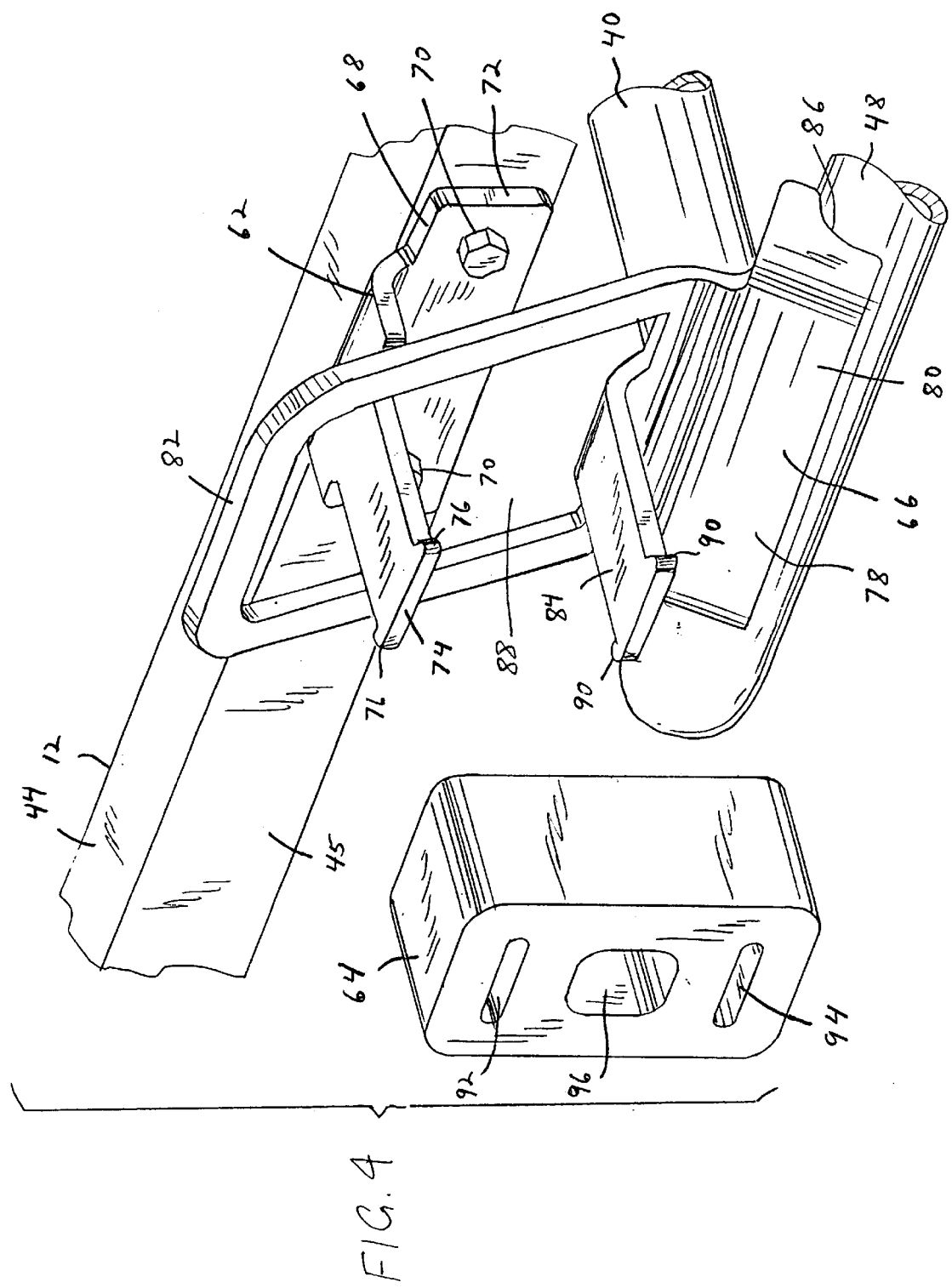
FIG. 4 is an enlarged exploded perspective view of the front connection of the motor carrier frame to the chassis shown in FIG. 3.

The car also comprises an engine or motor mounting system for mounting the engine 14 to the chassis 12. The mounting system generally comprises a motor carrier frame 40, a front connection 42, rear springs (not shown), and rear shock absorbers (not shown). The rear springs and shock absorbers are well known in the art, such as disclosed in U.S. Pat. No. 5,597,181 which is hereby incorporated by reference in its entirety. Referring also to FIGS. 3–4, the chassis 12 includes a cross-beam 44 between two side beams 46. The cross-beam 44 generally defines the front end of the engine receiving area 47 of the chassis 12.

The motor carrier frame 40 generally comprises a general U-shaped member 48, an engine support surface 50, and two rear spring/shock absorber mounting sections 52. However, in alternate embodiments the motor carrier frame could have any suitable configuration. The U-shaped member 48 generally comprises a one-piece bent tube member. However, in alternate embodiments the member 48 could have any suitable shape and need not be from a tubular stock material. The engine support surface 50 is fixedly and stationarily attached to the member 48, such as by welding. The support surface 50 is preferably formed from a flat plate and comprises engine mounting standoffs 54 and the holes 56 for fasteners (not shown) to attach the engine block 24 to the top surface of the support surface 50. The two rear mounting sections 52 are each connected to a separate end 58 of the U-shaped member 48, such as by welding. Each rear mounting section 52 includes holes 60 for fasteners (not shown) to attach the springs, shock absorbers, and rear axle assembly 36 to the motor carrier frame. However, any suitable rear connection configuration could be provided.

The front connection 42 generally comprises a first connection section 62, a resilient flexible member 64, and a second connection section 66. The first connection section 62 generally comprises a front end connector 68 fixedly attached to the chassis 12 by fasteners 70. The front end connector 68 is preferably a one-piece metal member with a base 72 and a cantilevered projection or beam 74. The base 72 is stationarily mounted on the front side 45 of the chassis cross-beam 44 by the fasteners 70. However, any suitable means could be used to attach the front end connector 68 to the chassis 12, such as welding, and at any suitable location. The cantilevered beam 74 extends from the front side 45 in a forward direction; towards the front end of the chassis 12. In this embodiment the front end of the cantilevered beam 74 includes retainers 76 extending from lateral sides of the beam. However, the retainers need not be provided, or any suitable retainer for retaining the resilient flexible member 64 on the beam 74 could be provided.

The second connection section 66 generally comprises a front end connector 78 fixedly attached to the motor carrier frame 40. The second connection section 66 generally comprises a one-piece member that is welded to the front end of the U-shaped member 48. However, any suitable means could be used to stationarily attach the second connection section 66 to the motor carrier frame 40. In addition, the front end connector 78 could be comprised of two or more pieces. Because the second connection section 66 is fixedly and stationarily attached to the U-shaped member 48, the second connection section 66 essentially becomes part of the motor carrier frame 40. In this embodiment the front end connector 78 of the second connection section 66 generally comprises a base section 80, an over-travel cage 82, and a cantilevered projection or beam 84. The base section 80 has side flanges with a recess 86 that receives part of the U-shaped member 48. The over-travel cage 82 has a general loop or ring shape with a center aperture 88. In this embodiment the cage 82 has a general rectangular shape, but any suitable shape could be provided. A bottom end of the cage 82 is attached to the base section 80. In this embodiment the cage 82 extends in a general cantilever fashion upward and forward at an angle relative to the base section 80. However, any suitable orientation could be provided. The cantilevered beam 84 extends in a general cantilever fashion from the bottom of the cage 82 in a forward direction substantially parallel to the top beam 74 of the chassis' front end connector 68. However, because of movement of the motor carrier frame 40 relative to the chassis 12, the two beams 74,84 will have yaw, pitch, roll, vertical and horizontal movement relative to each other during movement of the car 10. In this embodiment the front end of the bottom beam 84 includes retainers 90 extending from lateral sides of the beam. However, the retainers need not be provided, or any suitable retainer for retaining the resilient flexible member 64 on the beam 84 could be provided.

The resilient flexible member 64 is preferably a one-piece member comprised of a resilient rubber or polymer material. However, in alternate embodiments the member 64 could be comprised of multiple pieces. The resilient member 64 generally comprises two mounting apertures 92,94 and a hollowed area 96. The member 64 has a general rectangular block shape, but any suitable shape could be provided. The resilient member 64 is mounted on the two beams 74,84 and functions to connect the two beams 74,84 to each other. The top beam 74 extends into and through the top aperture 92. The bottom beam 84 extends into and through the bottom aperture 94. The height and width of the beams 74,84 are substantially the same as the height and width of the apertures 92,94 except at the front ends of the beams. More specifically, the retainers 76,90 make the front ends of the beams 74,84 wider than the apertures 92,94. Thus, once the resilient member 64 is mounted on the beams 74,84 with the front ends of the beams extending past the front end of the resilient member 64, the retainers 76,90 assist in preventing the resilient member 64 from inadvertently moving in a forward direction and coming off of the beams 74,84.

As seen best in FIGS. 2 and 3, with the resilient member 64 mounted on the two beams 74,84, the resilient member 64 connects the two beams to each other thereby connecting cross-beam 44 of the chassis 12 with the front end of the motor carrier frame 40. This is a resilient flexible connection. Thus, as the rear wheels of the car 10 move up and down relative to the chassis 12 as the car 10 moves, the rear axle assembly 36 (connected to the rear end of the carrier frame 40) twists, and turns and moves up and down. The resilient flexible member 64 allows the chassis and motor carrier frame to stay connected to each other at the front end of the motor carrier frame with the two beams 74,84 being able to yaw, pitch, roll and vertically move up and down relative to each other. The stiffness of the connection between the two beams 74,84 can be selected to be any suitable stiffness or resiliency by means of selection of material(s) for the member 64 and selection of appropriate dimensions for the member 64.

The front connection 42, in addition to the fixed resilient connection provided by the resilient flexible member 64, also provides an over-travel prevention feature. More specifically, the configuration of the front connection 42 limits the maximum amount of vertical and horizontal movement of the two connection sections 62,66 relative to each other. This is accomplished by means of the top beam 74 extending into the over-travel cage 82 and a portion of the resilient flexible member 64 being located or sandwiched between the two beams. The height of the aperture 88 is preferably larger than the height of the member 64 between the aperture 94 and the top surface of the member 64. The width of the aperture 88 is also preferably larger than the width of the member 64. However, in alternate embodiments the widths and/or the heights could be the same. The resilient member 64 can be compressed between the two beams, but only a limited amount. The size and shape of the aperture 96 can be selected to provide any suitable deformation characteristics for the resilient member 64. The resilient member 64 can also stretch between the two beams 74,84, but only a limited amount because the top of the cage 82 will contact the top of the resilient member 64, thereby limiting travel. Likewise, left and right relative movement of the two connection sections 62,66 relative to each other will be limited by contact of the cage 82 with left and right sides of the resilient member 64 proximate the top beam 74. Thus, an over-travel prevention feature is also provided for both vertical and horizontal directions.

One of the features of the present invention is in regard to assembly of the car 10. The front connection 42 allows the motor carrier frame 40 (perhaps with the motor 14 already attached) to be easily located relative to the chassis 12 with the top beam 74 merely being located into the aperture 88 of the cage 82. Interaction between the top beam 74 and the cage 82 can be used during the assembly process as a pre-connection (before the resilient member 64 is connected) to limit movement of the motor carrier frame 40 relative to the chassis 12. The rear mounting sections 52 (which can already have the rear axle assembly 36 attached) can then be connected to the chassis 12 by the springs and shock absorbers. The resilient member 64 can then be mounted on the two beams 74,84 to complete the connection of the motor carrier frame 40 to the chassis. The resilient member 64 can be connected to the beams 74,84 at the same time by merely locating the apertures 92,94 in front of the beams 74,84 and moving the member 64 with a single stroke in a rearward direction. In an alternate method the member 64 could be mounted to the beams 74,84 one at a time and could be connected to one of the beams before the cage 82 is positioned around the top beam 74.

Another feature of the present invention is that the present invention allows the front connection 42 to be located outside the engine receiving area 47. This is because the front connection 42 is located in front of the chassis cross-beam 44 rather than behind the cross-beam. This can allow the area 47 to be smaller than in conventional golf cars and/or can allow the motor carrier frame 40 to be longer with reduced amounts of movement at the front connection 42 because of the longer length. However, in an alternate embodiment, the front connection could be located in the engine receiving area if desired.

Figure 5:
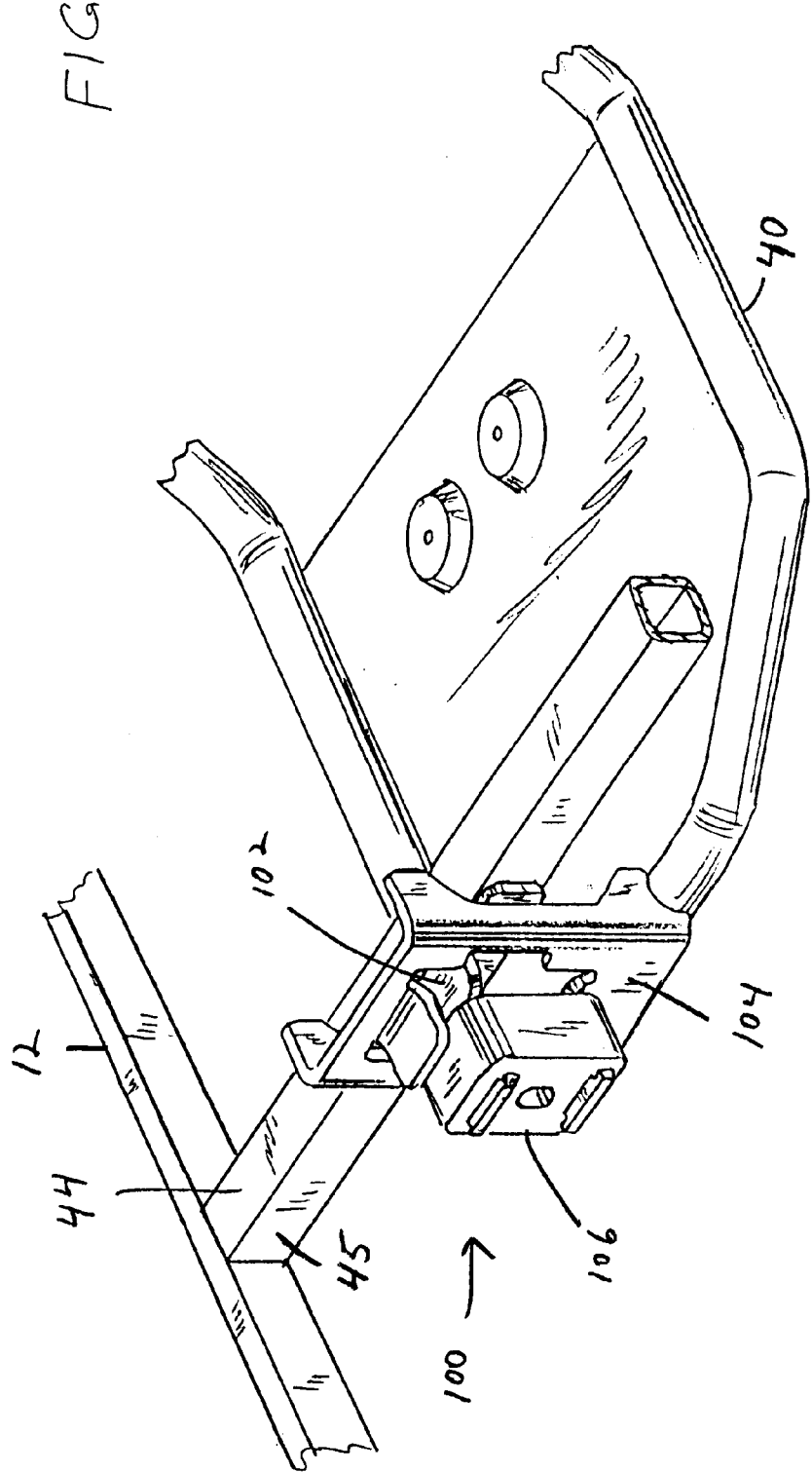
FIG. 5 is a partial perspective view similar to FIG. 3 of an alternate embodiment of the motor mounting system.
Figure 6:
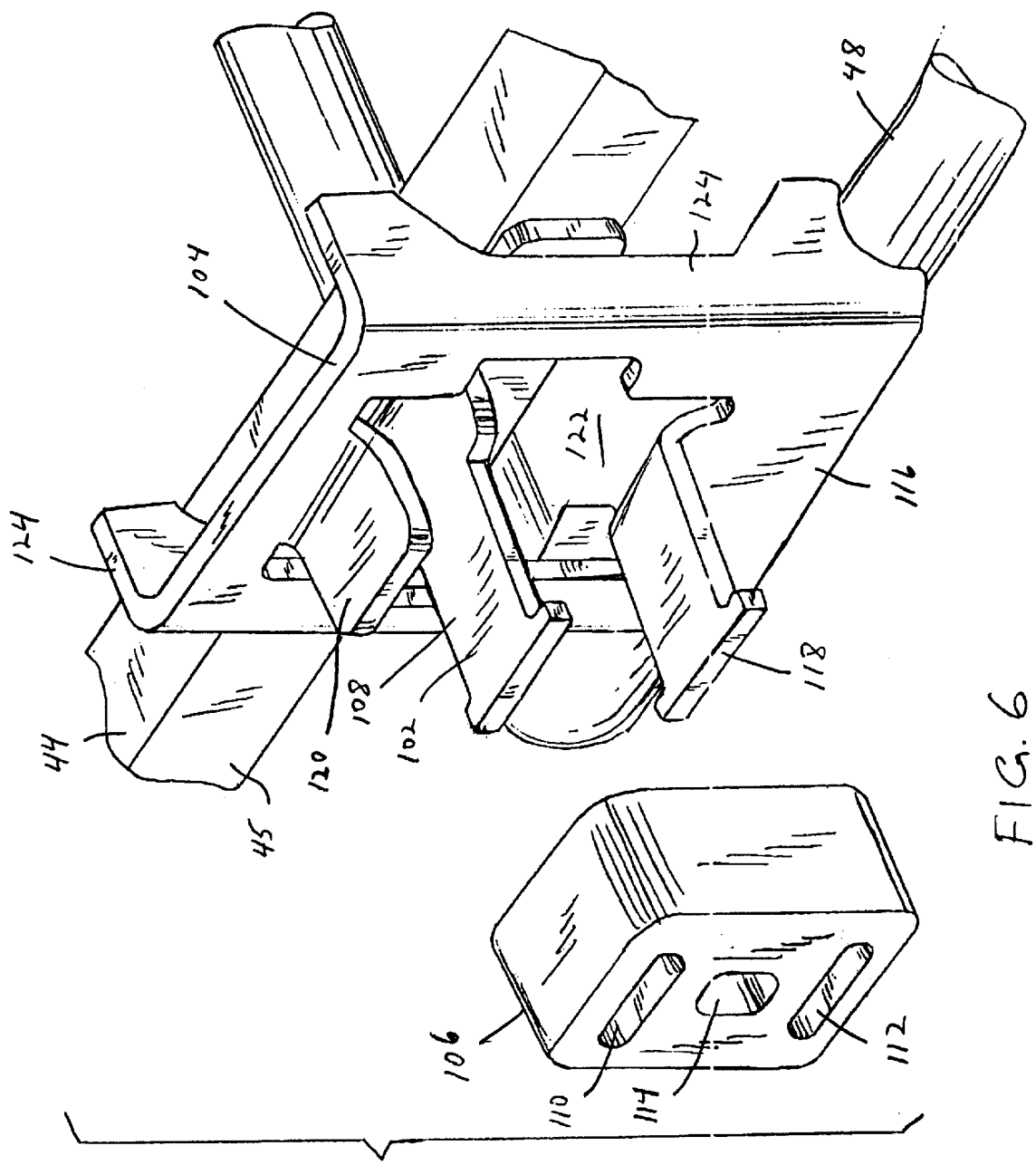
FIG. 6 is an enlarged exploded perspective view of the front connection of the motor carrier frame to the chassis shown in FIG. 5.

Referring now to FIGS. 5 and 6, another embodiment of the present invention is shown. In this embodiment the front end connection 100 generally comprises a first connection member 102, a second connection member 104, and a resilient flexible member 106. The first connection member 102 is substantially the same as the member 68, is attached to the front face 45 of the chassis cross-beam 44, and has its cantilevered beam 108 extend in a forward direction. The resilient flexible member 106 is substantially the same as the member 64 with two apertures 110,112, but a smaller stiffness reducing aperture 114. The second connection member 104 generally comprises a base section 116, a cantilevered beam 118, a top over-travel blocker 120, a center aperture 122 and transverse side walls 124. The base section 116 is preferably welded to the frame 48 of the motor carrier frame 40. The bottom beam 118 extends into the aperture 112. The top blocker 120 is located above the top surface of the member 106. The distance between the top blocker 120 and the bottom beam 118 is larger than the distance between the aperture 112 and the top of the member 106. The member 106 is located in front of the aperture 122 rather than in the aperture 122. In this embodiment the top end of the second connection member 104 is not forward angled relative to the base section 116. The transverse side wall 124 function as stiffeners to retain the second connection member 104 as a rigid structure. The two beams 108,118 can yaw, pitch, roll, vertically and horizontally move relative to each other with a fixed resiliently flexible connection being maintained by the member 106 and, over-travel prevention (which might otherwise permanently deform member 106) being provided by the top over-travel blocker 120 and the top beam 108 being located in the aperture 122. Thus, the portion of the second connection member 104 surrounding the aperture 122 forms an over-travel cage for the top beam 108 in the aperture 122. In an alternate embodiment the beams 108,118 could project in different or reverse directions.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

What is claimed is:

1. A vehicle including a motor mounting system, comprising:

a motor carrier frame; and a resilient flexible member connecting the motor carrier frame to a chassis of the vehicle, wherein the motor carrier frame comprises an over-travel cage with a portion of the chassis projecting into the cage and being movable in the cage, wherein the cage has a general loop shape which extends forward and upward from a front end of the motor carrier frame, and the motor carrier frame further comprising a cantilevered projection extending in a forward direction outwardly from a base of the cage and under a top portion of the cage.

2. The vehicle as in claim 1 wherein the motor carrier frame comprises a front end connector comprising the over-travel cage and a cantilevered projection extending in a forward direction from the cage.

3. The vehicle as in claim 1 wherein the resilient flexible member comprises a one-piece member having two receiving apertures for respectively receiving the portion of the chassis and a cantilevered portion of the motor carrier frame.

4. The vehicle as in claim 1 wherein the resilient flexible member is located, at least partially, in the cage.

5. A vehicle including a motor mounting system, comprising;

a motor carrier frame; and a resilient flexible member connecting the motor carrier frame to a chassis of the vehicle, wherein the resilient flexible member comprises a one-piece member with a first receiving aperture and a second receiving aperture, wherein a portion of a first connection section on the chassis projects into the first receiving aperture and a portion of a second connection section on the motor carrier frame projects into the second receiving aperture, wherein the second connection section further comprises an over-travel cage extending around the portion of the first connection section said portion of said second connection section extending in a forward direction outwardly from a base of the cage and under a top portion of the cage.

6. The vehicle as in claim 5 wherein the portion of first connection section comprises a cantilevered beam.

7. The vehicle as in claim 6 wherein the cantilevered beam projects in a forward direction from the chassis towards a front end of the chassis.

8. The vehicle as in claim 7 wherein the portion of the second connection section comprises a cantilevered beam projecting in the forward direction from the motor carrier frame.

* * * * *